March 20, 1956 R. W. LEE 2,739,308

ELECTRICAL APPARATUS FOR USE WITH A SECTIONAL SCAN

Filed Sept. 19, 1945

*INVENTOR.*
RICHARD W. LEE
BY
*ATTORNEY.*

United States Patent Office 2,739,308
Patented Mar. 20, 1956

2,739,308
ELECTRICAL APPARATUS FOR USE WITH A SECTIONAL SCAN

Richard W. Lee, Watertown, Mass., assignor, by mesne assignments, to the United States of America as represented by the Secretary of War Application September 19, 1945, Serial No. 617,319

6 Claims. (Cl. 343—11)

This invention relates to cathode ray tube indicators such as those used with radio object-locating systems and more particularly to circuits for the selection of a portion of the presentation on an indicator for portrayal on an auxiliary indicator.

In many applications of radio object-locating systems the radiating element of the system rotates throughout 360 degrees in azimuth, and the target data is presented as plan position indication (P. P. I.). In this type of presentation all observed targets appear on the indicator screen plotted in polar coordinates. Such systems employing P. P. I. may be used in the control of aircraft for interception of other craft or other similar uses and in such cases a portion or section of the complete P. P. I. picture is portrayed on one or more auxiliary indicators which are commonly referred to as sectional P. P. I. indicators. A discussion on sector display indicators is given in volume 22, chapter 14 of the Massachusetts Institute of Technology Radiation Laboratory Series, published by McGraw-Hill Book Co. Inc., 1948.

On these indicators sections of the range sweep and of the azimuthal sweep are portrayed to an expanded scale. It is obvious, however, that if the section of the azimuthal sweep represents a constant number of degrees, the physical size of the presentation will be dependent upon the range at which the range section is selected.

It is an object of the present invention, therefore, to present novel apparatus for maintaining the physical size of the presentation on a sectional plan position indicator approximately constant.

A further object is to provide an apparatus for use with a sectional plan position indicator to blank the beam of the indicator for that portion of the azimuth angle of each complete scan that is outside the limits of the azimuth angle of a sector selected for display on the indicator and to keep constant the average azimuth width of a sector displayed on the indicator regardless of the average range of the sector selected for display.

Figure 1:
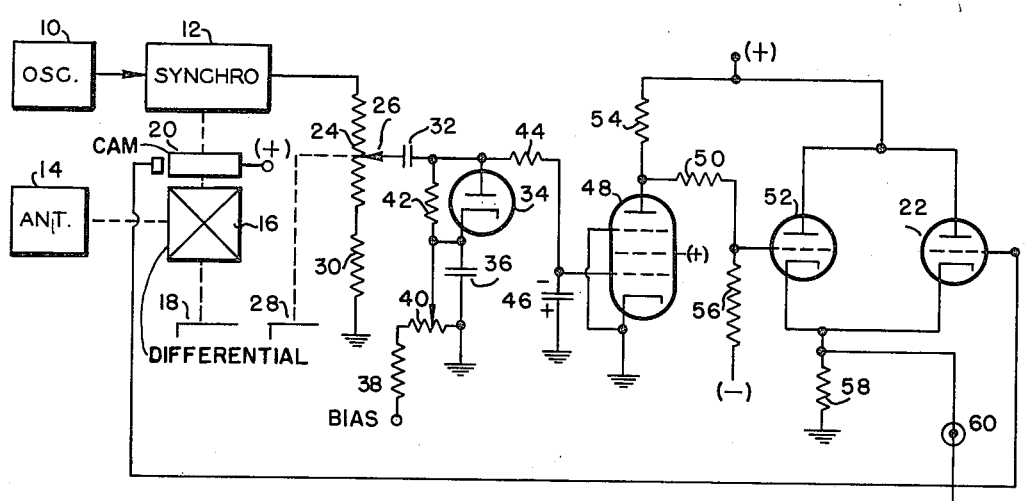
Figure 1:
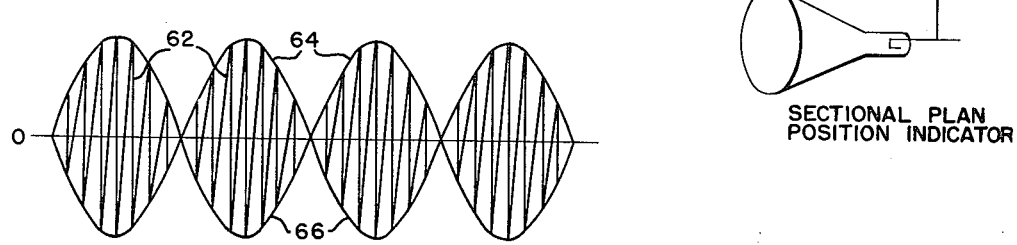
Figure 2:
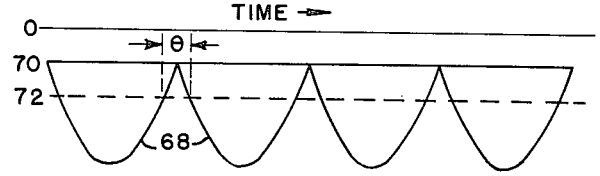
Figure 2:
Figure 2:
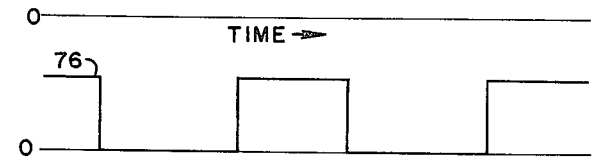
Figure 2:
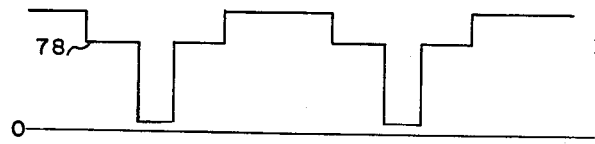

For a better understanding of the present invention, together with other and further objects thereof, reference is had to the following description, which is to be read in connection with the accompanying drawing in which:

Fig. 1 is a schematic illustration of a preferred embodiment of the present invention; and Fig. 2 illustrates certain voltage waveforms pertinent to the apparatus of Fig. 1.

When displaying a sector or portion of a plan position indication on an auxiliary indicator, it can be shown that the average azimuthal width of the sector should be equal to the length in range if a maximum area of the indicator tube screen is to be used at all ranges at which the sector might be chosen. The matter by which this equality is obtained and maintained will become more apparent from the discussion which follows.

Referring now to the drawing, there is shown in Fig. 1 an azimuth blanking circuit which accomplishes the above mentioned equality between average azimuth width and range length of the sector. An azimuth blanking circuit is here taken to mean a circuit for producing a voltage pulse substantially rectangular in waveform which occurs at such times as to cause a given portion of the azimuthal scan of the associated radio object-locating system to be selected. The rectangular voltage output will normally control such circuits as the azimuth sweep generator and also the intensity of the auxiliary or sectional indicator. Uses of such blanking circuits are assumed to be well known in the electronic art, and further discussion of their applications will be dispensed with.

The blanking circuit of Fig. 1 comprises an oscillator 10, the frequency of oscillation of which is preferably in the audio range, electrically connected to one winding of a synchro device 12. The synchro device 12 may be any of the devices known to the art as "Selsyns," or "Synchroties" or any other device such as a single phase motor having a wound rotor or a rotary transformer which when energized by a suitable source of alternating voltage will provide an output voltage the amplitude of which is a sine function of the relative angular displacement of the windings thereof. The antenna, represented by block 14, of the radio object-locating system is mechanically connected through a differential 16 to the rotating portion of synchro device 12. A handwheel 18 is connected to the differential 16 and permits altering the relative positions of the antenna 14 and the rotating portion of device 12, thus permitting selection of the portion of the azimuthal scan which is to be portrayed on the sectional indicator. A cam and switch 20, mounted on the rotating portion of device 12, is connected between a source of positive potential and a control grid of a vacuum tube 22. The cam 20 is so formed that the positive potential is applied to the control grid of tube 22 during one-half of each revolution of the rotating portion of device 12. An electrical connection from device 12 connects to one end of a potentiometer 24 which has a movable tap 26 thereon. A handwheel 28, which also serves as the range handwheel to select the portion of the range which is to be portrayed on the sectional P. P. I., is connected to the tap 26. A resistor 30 is connected between the remaining end of potentiometer 24 and ground. A coupling capacitor 32 connects the tap 26 to the anode of a rectifier tube 34. The cathode of tube 34 is connected through a by-pass capacitor 36 to ground and to a source of variable bias formed by a source of bias potential, not shown, a resistor 38, and a potentiometer 40. A resistor 42, preferably large compared to the resistance of the tube 34 and potentiometer 40 is connected between the anode and cathode of tube 34. A resistor 44, preferably having a resistance approximately equal to that of resistor 42, is connected in series with a filter capacitor 46, and together they are connected between the anode of tube 34 and ground. The junction of resistor 44 and capacitor 46 is connected to the control grid of a vacuum tube 48 which serves as an amplifier and which is directly coupled through a resistor 50 to the control grid of a vacuum tube 52. A resistor 54, which is connected to a source of positive potential, serves as the plate load resistor for the amplifier which includes the tube 48. Resistors 50 and 54, together with a resistor 56, which is connected to a source of negative potential, form a voltage divider to properly bias the tube 52. The anodes of tubes 52 and 22 are returned to suitable sources of positive potential. The cathodes of tubes 52 and 22 are connected together and returned to ground through a common resistor 58. An output from the circuit shown is provided at the cathodes of tubes 52 or 22 or at a terminal labeled 60.

In Fig. 2 waveform 62 represents the output of the synchro device 12 or the voltage at the tap 26 as the antenna 14 rotates through two complete revolutions. The smooth curves 64 and 66 represent the modulation envelope of waveform 62. The waveform 68 represents the potential across capacitor 46. The voltage level 70 is determined by the setting of potentiometer 40 while the voltage level 72 represents the cutoff potential for the tube 48. The voltage waveform 74 represents the variation of the potential of the anode of the tube 48. The voltage waveform 76 is indicative of the voltage applied through the cam and switch 20 to the control grid of tube 22. The waveform 78 is indicative of the output voltage at the terminal 60.

In describing the operation of the apparatus of Fig. 1 constant reference will be had to the waveforms of Fig. 2. The output of the device 12 when energized by the oscillator 10 and driven by the antenna 14 through the differential 16 will be similar to the waveform 62, Fig. 2. Adjustment of the handwheel 28 adjusts the amplitude of the signal applied through capacitor 32. It will be noted that the cathode of tube 34 is essentially at ground potential for signals at the frequency of the oscillator 10 due to the by-pass action of capacitor 36. On the positive going half cycle of the signal at the tap 26 the tube 34 will conduct, and no charge will be added to or taken from the capacitor 46. On the negative half cycles of the signal at the tap 26 the tube 34 will not conduct, and the capacitor will charge through the resistor 44 with a plus-minus polarity as shown. It will be seen that the capacitor 46 must discharge through the series combination of resistors 42 and 44, and hence the discharge time constant is longer than the charging time constant and the voltage across the capacitor 46 will, therefore, be similar to the envelope 66 or waveform 68, Fig. 2. The level 72, Fig. 2 is set by the operating conditions of the tube 48. The length of time or portion of each half cycle of revolution of antenna 14 during which the tube 48 conducts is determined by the level 70 which is determined by the setting of the potentiometers 40 and 24.

It can be shown that angle $\theta$, Fig. 2, is given by $$(1) \qquad \theta = 2 \sin^{-1} \frac{K_2}{K_1 + R}$$

wherein $K_2$ is a constant determined by the bias on the tube 48, $K_1$ is a constant determined by the resistance of resistor 30 and R is a variable proportional to the range at which the sectional P. P. I. starts and determined by the setting of the handwheel 28 and the resistance from the tap 26 to the junction of potentiometer 24 and resistor 30. The portion of the time base represented by $\theta$ may be expressed in degrees, since it is a portion of one cycle or revolution of the antenna 14. It can also be shown that the average azimuthal width of the sector displayed will be equal to the length in range, $R_s$, of the sector displayed if the following relation is true:

$$(2) \qquad (R + R_s/2) \sin \frac{\theta}{2} = R_s/2$$

The left-hand expression will be seen to be an approximation for one-half the average azimuthal width of the sector whereas the right-hand expression is one-half the length in range of the sector.

It can, therefore, be seen that the above stated requirements can be met by use of the circuit of Fig. 1 if proper choices of resistance of resistor 30 and of bias on tube 48, i. e. level 72, Fig. 2, are made. In this manner the width of the azimuth gates waveform 74, becomes a function of the range of the sector and, as a consequence, the maximum area of the indicator screen is utilized at all ranges.

From waveform 74 it is seen that two azimuth gates or blanking pulses are generated each revolution. To eliminate the undesired one, use is made of the cam and switch 20 which applies voltage, waveform 76, to the control grid of the tube 22. During one-half of each revolution of the antenna 14, the control grid of tube 22 is held highly positive. This causes heavy plate current flow with a subsequent high voltage on the cathodes of tubes 22 and 52. This potential is sufficient to render the tube 52 cutoff and prevent the azimuth gate signal, waveform 74, from appearing at terminal 60. During the remaining one-half of each revolution of the antenna, the voltage on the control grid of tube 22 is low, and tube 52 is in a conducting state such that the azimuth gate signal on the control grid thereof may appear at the terminal 60. Waveform 78, which represents the waveform of the voltage at terminal 60, may be passed through a clipping circuit to eliminate all variations except the desired azimuth gate and utilized in any desired manner thereafter.

While there has been described what is at present considered the preferred embodiment of the present invention, it will be obvious to those skilled in the art that various changes and modifications may be made therein without departing from the invention.

What is claimed is:

1. In a sectional plan position indicator circuit forming part of a radio object-locating system having a rotating antenna, an electrical apparatus for maintaining the azimuthal width of a scanned sector substantially equal to its length in range as the average range of the sector is varied, said apparatus comprising oscillator means, means for modulating the amplitude of the signal from said oscillator means in accordance with the sine of the angular deviation of the antenna of the radio object-locating system from a predetermined reference point, means associated with the antenna and said modulating means for changing the phase of said modulation relative to the position of the antenna, first amplifier means, rectifier means connected to the input of said first amplifier means, bias means adapted to control the cutoff voltage on said first amplifier means, means for applying an amplitude portion of the output of said oscillator means to said rectifier means, the amplitude of said applied signal being a function of the average range of the section portrayed, second amplifier means connected to the output of said first amplifier means, and means associated with said modulating means for rendering said second amplifier means nonconducting during one-half of each revolution of the antenna, whereby said bias means and the range of the section portrayed cause the time of conduction of said first amplifier means to be such that the average azimuthal width of the sector will be substantially equal to the range length of the sector.

2. In a sectional plan position indicator circuit forming part of a radio object-locating system, an electrical apparatus for maintaining the azimuthal width of a scanned sector substantially equal to its length in range as the average range of the sector is varied, said apparatus comprising means for generating a voltage, the amplitude of which is a sinusoidal function of the angular deviation of the antenna of the radio object-locating system from an adjustable voltage reference level, voltage divider means connected to said generating means and adapted to provide an output which is a function of the average range of the sector, amplifier means connected to the output of said voltage divider means, variable bias means including a rectifier and condenser to determine the level of operation of said amplifier, and means associated with said amplifier means for controlling the portion of each revolution of the antenna during which said amplifier means is conducting whereby a pulse is produced for azimuth blanking on the sectional plan position indicator.

3. A blanking pulse generating apparatus for use in a radio object locating device having a rotating antenna and a sectional plan position indicator, said apparatus comprising; first means having a rotating element and generating a voltage whose amplitude is a function of the angle of rotation of said rotating element relative to an angular reference position of said rotating element; second means connected to said rotating element and adapted for connection to the antenna whereby said rotating element is adapted to rotate synchronously with the antenna whereby the amplitude of the generated voltage varies cyclically at a frequency that is an integer multiple of the rate of antenna rotation, said second means being adjustable whereby it is adapted for adjusting the angular position of said rotating element relative to the angular position of the antenna whereby the phase of the waveform of the amplitude of the voltage generated by said first means may be changed relative to angular position of the antenna; third means coupled to said first means for producing a pulsating voltage of the same frequency as the cyclically variable amplitude of the generated voltage, said third means being adjustable for varying the pulsating voltage pulse width in accordance with the range of the sector selected for display on the sectional plan position indicator; and fourth means coupled to said third means and to said rotating element for shaping and amplifying the pulsating voltage into a voltage waveform having one blanking pulse coincident with the greater portion of each rotation of the antenna, said fourth means being adapted to be coupled to the sectional plan position indicator.

4. A blanking pulse generating apparatus as defined in claim 3 wherein said first means generates a voltage whose amplitude varies as a sine function of the angle of rotation of said rotating element relative to an angular reference position of said rotating element.

5. A blanking pulse generating apparatus for use in a radio object locating device having a rotating antenna and a sectional plan position indicator, said apparatus comprising; first means having a rotating element and generating a voltage whose amplitude is a function of the angle of rotation of said rotating element relative to an angular reference position of said rotating element; second means connected to said rotating element and adapted for connection to the antenna whereby said rotating element is adapted to rotate synchronously with the antenna whereby the amplitude of the generated voltage varies cyclically at a frequency that is an integer multiple of the rate of antenna rotation, said second means being adjustable whereby it is adapted for adjusting the angular position of said rotating element relative to the angular position of the antenna whereby the phase of the waveform of the amplitude of the voltage generated by said first means may be changed relative to angular position of the antenna; and third means electrically coupled to said first means and mechanically coupled to said rotating element for producing a pulsating voltage of frequency that corresponds to the rate of rotation of said rotating element, said third means being adjustable for changing the pulsating voltage pulse width in accordance with the range of the sector selected for display on the sectional plan position indicator whereby each pulse thereof is coincident with a selected portion of each rotation of the antenna, said third means being adapted to be coupled to the sectional plan position indicator whereby each pulse for its duration will blank the beam of the indicator.

6. A blanking pulse generating apparatus as defined in claim 5 wherein said first means generates a voltage whose amplitude varies as a sine function of the angle of rotation of said rotating element relative to an angular reference position of said rotating element.

References Cited in the file of this patent
UNITED STATES PATENTS

| | | |
|---|---|---|
| 2,400,791 | Tolson et al. | May 21, 1946 |
| 2,406,799 | Busignies | Sept. 3, 1946 |
| 2,421,747 | Englehardt | June 10, 1947 |
| 2,446,024 | Porter | July 27, 1948 |